US006424459B1

United States Patent
Yokota

(10) Patent No.: US 6,424,459 B1
(45) Date of Patent: Jul. 23, 2002

(54) GAIN-FLATTENING OF AN OPTICAL AMPLIFIER WITH SPLIT-BAND ARCHITECTURE

(75) Inventor: Izumi Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/532,782

(22) Filed: Mar. 22, 2000

(30) Foreign Application Priority Data

Jul. 7, 1999 (JP) .......................................... 11-192885

(51) Int. Cl.[7] .................................................. H01S 3/00
(52) U.S. Cl. ................................................. 359/341.42
(58) Field of Search .......................... 372/6, 194, 337.1, 372/337.11, 337.12, 337.13, 337.2, 337.21, 337.22, 337.3, 337.4, 337.5, 337, 341.1; 359/341.2, 341.3, 341.31, 341.32, 341.33, 341.4, 341, 42, 341.43, 349.44, 341.45

(56) References Cited

U.S. PATENT DOCUMENTS

| 5,838,488 | A | * | 11/1998 | Kobayashi | .................. | 359/341 |
|---|---|---|---|---|---|---|
| 5,864,423 | A | * | 1/1999 | Kosaka | ....................... | 359/341 |
| 5,986,800 | A | * | 11/1999 | Kosaka | ....................... | 359/341 |
| 6,049,417 | A | * | 4/2000 | Srivastava et al. | .......... | 359/341 |
| 6,049,418 | A | * | 4/2000 | Srivastava et al. | .......... | 359/341 |
| 6,104,527 | A | * | 8/2000 | Yang | ......................... | 359/341 |
| 6,310,716 | B1 | * | 10/2001 | Evans et al. | ................. | 359/334 |

FOREIGN PATENT DOCUMENTS

| DE | 19845794 | * | 3/2000 | ............ H04J/14/02 |
|---|---|---|---|---|
| JP | 3-195147 | * | 8/1991 | ........... H04L/12/48 |
| JP | 4-150240 | * | 5/1992 | ........... H04L/12/56 |
| JP | 4-192742 | * | 7/1992 | ........... H04L/15/56 |
| JP | 8-79304 | * | 3/1996 | ........... H04L/12/56 |
| JP | 4-352230 | | 12/1996 | ............. G06F/7/52 |
| JP | 9-326843 | * | 12/1997 | ........... H04L/29/08 |
| WO | WO-00/21164 | * | 4/2000 | ............. H01S/3/00 |

OTHER PUBLICATIONS

Ono et al., "Gain–Flattened Er3+—Doped Fiber Amplifier for a WDM Signal in the 1.57–1.60 micrometer Wavelength Region", IEEE Photonics Technology Letters, vol. 9, May 1997, pp. 596–598.*

* cited by examiner

Primary Examiner—Thomas H. Tarcza
Assistant Examiner—Deandra M. Hughes
(74) Attorney, Agent, or Firm—Staas & Halsey LLP

(57) ABSTRACT

The optical amplifier according to the present invention includes a first optical amplifier for a first band (e.g., conventional band: C band), a second optical amplifier for a second band (e.g., long-wavelength band: L band), an optical demultiplexer and an optical multiplexer for connecting the first and second optical amplifiers in parallel, and a control unit for controlling the first and second optical amplifiers so that the optical power at an output port becomes constant. With this configuration, band broadening can be attained by adopting the first and second optical amplifiers, and the configuration can be simplified by using the control unit commonly for the first and second optical amplifiers.

35 Claims, 10 Drawing Sheets

FIG. 7A

|  | A | B | C | D | E | F |
|---|---|---|---|---|---|---|
| C-BAND | ↘ |  | ↘ |  |  | ↗ |
|  |  | ↘ | ↘ | ↗ | ↗ |  |
| L-BAND | → |  | ↗ |  |  | → |

FIG. 7B

|  | A | B | C | D | E | F |
|---|---|---|---|---|---|---|
| C-BAND | ↘ |  | → |  |  | ↗ |
|  |  | → |  | ↗ | ↘ |  |
| L-BAND | ↘ |  | → |  |  | ↗ |

GAIN-FLATTENING OF AN OPTICAL AMPLIFIER WITH SPLIT-BAND ARCHITECTURE

BACKGROUND OF THE INVENTION

1. Field of the Invention

The present invention relates generally to an improvement in an optical amplifier such as an erbium doped fiber amplifier (EDFA), and more particularly to an optical amplifier suitable for broad-band wavelength division multiplexing (WDM) and a system having the optical amplifier.

2. Description of the Related Art

In recent years, a manufacturing technique and utilizing technique for a low-loss (e.g., 0.2 dB/km) silica optical fiber have been established, and an optical communication system using the optical fiber as a transmission line has been put to practical use. Further, to compensate for losses in the optical fiber and thereby allow long-haul transmission, an optical amplifier for amplifying an optical signal or signal light has been put to practical use.

An optical amplifier known in the art includes an optical amplifying medium to which signal light to be amplified is supplied and a pumping unit for pumping (exciting) the optical amplifying medium so that the optical amplifying medium provides a gain band including the wavelength of the signal light.

For example, an erbium doped fiber amplifier (EDFA) has been developed to amplify signal light having a wavelength band of 1.55 $\mu$m where the loss in a silica fiber is minimum. The EDFA includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a wavelength band of 1.55 $\mu$m can be obtained.

Further, another optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain main signal light (WDM signal light), which is output to an optical fiber transmission line. At a receiving end, the main signal light received is separated into individual optical signals by an optical demultiplexer, and transmitted data (a main signal) is reproduced according to each optical signal. Accordingly, by applying WDM, the transmission capacity by a single optical fiber can be increased according to the number of WDM channels.

In the case of incorporating an optical amplifier into a system adopting WDM, a transmission distance is limited by the wavelength characteristic of gain of the optical amplifier which characteristic is represented by a gain deviation or gain tilt. For example, in a typical EDFA, it is known that a gain deviation is produced at wavelengths near 1.55 $\mu$m. If the gain deviations in a plurality of cascaded EDFAs are accumulated, an optical SNR (signal-to-noise ratio) in a channel included in a low-gain band is degraded. Accordingly, to allow high-quality transmission, it is preferable to flatten the wavelength characteristic of gain of an optical amplifier.

In a conventional EDF, an EDF so designed as to obtain a flat wavelength characteristic of gain in a short-wavelength band or conventional wavelength band (referred to as "1.55 $\mu$m band" or "C band: center band or conventional band") defined by the range of about 1.53 to 1.57 $\mu$m is used as an optical amplifying medium. However, the width of a wavelength region where the wavelength characteristic of gain in the C band is flat is about 15 to 20 nm. Accordingly, in the case that the wavelength spacing is set to 0.8 nm, the number of channels of WDM signal light becomes about 25. In the case that the wavelength spacing is set to 0.4 nm, the number of channels of WDM signal light becomes about 50. In general, the wavelength spacing is limited by the bit rate of each signal, techniques of optical multiplexing/demultiplexing in a terminal device, nonlinear effects in an optical fiber transmission line, etc.

To further increase the number of WDM channels, research and development are being pursued on the use of a long-wavelength band (referred to as "1.58 $\mu$m band" or "L band: long wavelength band") defined by the range of about 1.57 to 1.61 $\mu$m. In an EDF for the L band, the width of a wavelength region where a flat wavelength characteristic of gain is obtained is about 30 nm. Thus, the EDF for the L band can broaden the band where a flat wavelength characteristic of gain is obtained as compared with the EDF for the C band. Further, by combining an optical amplifier for the C band and an optical amplifier for the L band to configure an optical amplifier, the band where a flat wavelength characteristic of gain is obtained can be further broadened.

Although the above-mentioned optical amplifier configured by the combination of the C band and the L band has an advantage on band broadening, optical components or the like for constructing each of the optical amplifiers for the C band and the L band are required, causing a complicated configuration of the optical amplifier as a whole.

SUMMARY OF THE INVENTION

It is therefore an object of the present invention to provide an optical amplifier having a broad band and a simple configuration. It is another object of the present invention to provide a system having such an optical amplifier. Other objects of the present invention will become apparent from the following description.

In accordance with an aspect of the present invention, there is provided an optical amplifier comprising first and second optical amplifiers, an optical demultiplexer, an optical multiplexer, and a control unit. The first optical amplifier provides a gain for a first band. The second optical amplifier provides a gain for a second band different from the first band. The optical demultiplexer optically couples the first optical amplifier and an input port by the first band, and optically couples the second optical amplifier and the input port by the second band. The optical multiplexer optically couples the first optical amplifier and an output port by the first band, and optically couples the second optical amplifier and the output port by the second band. The control unit controls the first and second optical amplifiers so that the optical power at the output port becomes constant.

With this configuration, the optical demultiplexer and the optical multiplexer respectively have a wavelength demultiplexing function and a wavelength multiplexing function, so that an optical signal supplied to the input port and having a wavelength included in the first band is amplified by the first optical amplifier and the amplified optical signal is output from the output port, whereas another optical signal supplied to the input port and having a wavelength included in the second band is amplified by the second optical amplifier and the amplified optical signal is output from the output port. Accordingly, an optical amplifier having a broad band can be provided. Further, the control unit operates commonly to the first and second optical amplifiers so as to maintain the optical power at the output port constant. Accordingly, a circuit for ALC (automatic level control) can be formed commonly for the first and second optical amplifiers, thereby simplifying the configuration of the optical amplifier.

Each of the first and second optical amplifiers may comprise a doped fiber doped with a rare earth element, and a pumping source for supplying pump light to the doped fiber. In this case, the control unit may control the powers of the pump lights to be supplied to the doped fibers of the first and second optical amplifiers.

In the case that an EDF is used as the doped fiber, the first band may include a C band defined by the range of 1.53 to 1.57 µm, and the second band may include an L band defined by the range of 1.57 to 1.61 µm. In the case that the doped fibers of the first and second optical amplifiers have the same composition, the doped fiber of the second optical amplifier may be set longer than the doped fiber of the first optical amplifier, thereby making the first and second optical amplifiers provide gains for the C band and the L band, respectively.

In accordance with another aspect of the present invention, there is provided a system comprising an optical fiber transmission line for transmitting WDM signal light obtained by wavelength division multiplexing at least one optical signal having a wavelength included in a first band and at least one optical signal having a wavelength included in a second band different from the first band; and at least one optical repeater arranged along the optical fiber transmission line. Each of the at least one optical repeater includes the optical amplifier according to the present invention.

This system employs the optical amplifier according to the present invention, so that the transmission of large-capacity data can be performed by broad-band wavelength division multiplexing, and the configuration of the system can be simplified.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 7A and 7B are diagrams for illustrating the operation of the ALC circuit shown in FIG. 5;

DETAILED DESCRIPTION OF THE PREFERRED EMBODIMENTS

Figure 1:
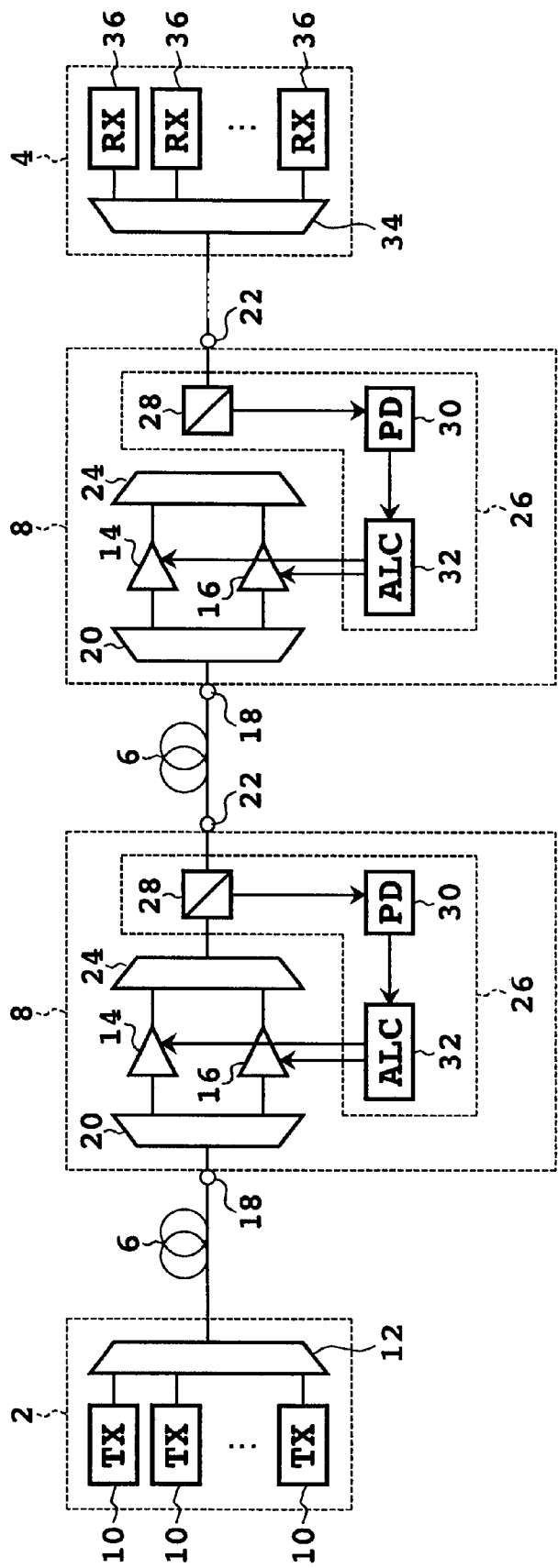
FIG. 1 is a block diagram showing a preferred embodiment of the system according to the present invention.

Some preferred embodiments of the present invention will now be described in detail with reference to the attached drawings. Throughout the drawings, the same reference numerals denote the same or like parts.

FIG. 1 is a block diagram showing a preferred embodiment of the system according to the present invention. This system includes a first terminal device 2 as a transmitting end, a second terminal device 4 as a receiving end, an optical fiber transmission line 6 placed between the terminal devices 2 and 4, and a plurality of optical repeaters (optical amplifiers) 8 arranged along the optical fiber transmission line 6. The plural optical repeaters 8 may be replaced by a single optical repeater 8 arranged along the optical fiber transmission line 6.

The first terminal device 2 includes a plurality of optical transmitters (TX) 10 for outputting optical signals having different wavelengths and an optical multiplexer 12 for wavelength division multiplexing the optical signals output from the optical transmitters 10 to output resultant WDM signal light to the optical fiber transmission line 6. At least one of the optical transmitters 10 outputs a single or a plurality of optical signals having a single or different wavelengths included in a first band, and the other optical transmitter or transmitters 10 output a single or a plurality of optical signals having a single or different wavelengths included in a second band different from the first band. More specifically, the first and second bands include the C band and the L band described above, respectively. In the following description, it is assumed that the first and second bands coincide with the C band and the L band, respectively, for ease of understanding of the present invention.

Each optical repeater 8 includes a first optical amplifier 14 for providing a gain for the C band and a second optical amplifier 16 for providing a gain for the L band. An optical demultiplexer 20 is provided to optically couple the first optical amplifier 14 and an input port 18 of the optical repeater 8 by the C band and to optically couple the second optical amplifier 16 and the input port 18 by the L band. The input port 18 is connected to an upstream part of the optical fiber transmission line 6. Further, an optical multiplexer 24 is provided to optically couple the first optical amplifier 14 and an output port 22 of the optical repeater 8 by the C band and to optically couple the second optical amplifier 16 and the output port 22 by the L band. The output port 22 is connected to a downstream part of the optical fiber transmission line 6. Each optical repeater 8 further includes a control unit 26 for controlling the optical amplifiers 14 and 16 so that the optical power at the output port 22 becomes constant.

In this preferred embodiment, the control unit 26 includes an optical beam splitter 28 for separating an output from the optical multiplexer 24 to obtain a monitor beam, a photodetector (PD) 30 such as a photodiode for receiving the monitor beam output from the optical beam splitter 28, and an ALC (automatic level control) circuit 32 for controlling the optical amplifiers 14 and 16 according to an output from the photodetector 30.

Each of the optical amplifiers 14 and 16 may include a doped fiber doped with a rare earth element and a pumping source for supplying pump light to the doped fiber. Each pumping source may be provided by a laser diode (LD). In this case, the control unit 26 can control the power of each pump light by changing a drive current (bias current) for the laser diode. Particularly in this preferred embodiment, erbium (Er) is selected as the rare earth element to provide an optical amplifier having a broad band including both the C band and the L band.

FIG. 1 shows terminal device 4 as including a demultiplexer 34 and a plurality of optical receivers (RX) 36.

Figure 2:
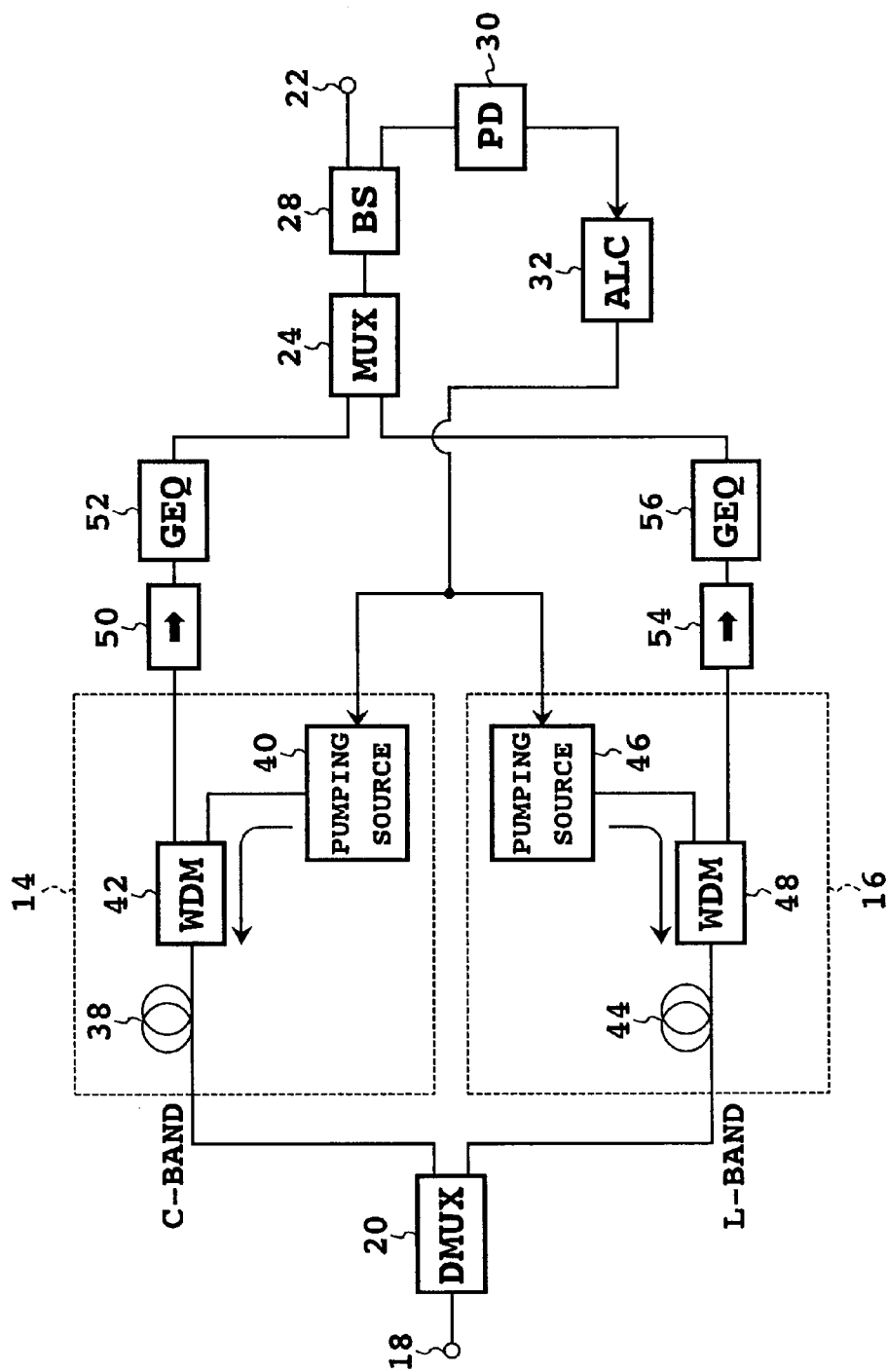
FIG. 2 is a block diagram showing a preferred embodiment of the optical amplifier according to the present invention.

FIG. 2 is a block diagram showing a preferred embodiment of the optical amplifier according to the present invention. The optical amplifier according to the present invention is applicable to each optical repeater 8 shown in FIG. 1.

The optical amplifier 14 for the C band includes an EDF 38 having a predetermined length, a pumping source 40 for outputting pump light having a predetermined wavelength, and a WDM coupler 42 for introducing the pump light output from the pumping source 40 into the EDF 38. Similarly, the optical amplifier 16 for the L band includes an EDF 44 having a predetermined length, a pumping source 46 for outputting pump light having a predetermined wavelength, and a WDM coupler 48 for introducing the pump light output from the pumping source 46 into the EDF 44. Each of the pumping sources 40 and 46 may be provided by a laser diode oscillating in a 0.98 $\mu$m band defined by the range of 0.96 to 1.00 $\mu$m or in a 1.48 $\mu$m band defined by the range of 1.46 to 1.50 $\mu$m and a drive circuit for the laser diode.

In this preferred embodiment, the WDM couplers 42 and 48 are provided downstream of the EDFs 38 and 44, respectively, so that the WDM signal light or the optical signal and the pump light propagate in opposite directions in each of the EDFs 38 and 44 (backward pumping). Alternatively, each WDM coupler may be provided upstream of the corresponding EDF to perform forward pumping so that the WDM signal light or the optical signal and the pump light may propagate in the same direction in each EDF. Further, forward pumping and backward pumping may be combined to perform bidirectional pumping.

An optical isolator 50 and a gain equalizer (GEQ) 52 are provided on a first optical path connecting the optical demultiplexer 20 and the optical multiplexer 24 and including the first optical amplifier 14. Similarly, an optical isolator 54 and a gain equalizer 56 are provided on a second optical path connecting the optical demultiplexer 20 and the optical multiplexer 24 and including the second optical amplifier 16. The use of the optical isolator 50 (54) can prevent formation of an optical resonator structure including the EDF 38 (44), thereby allowing a stable operation of the optical amplifier 14 (16). The gain equalizers 52 and 56 have characteristics of substantially flattening the wavelength characteristic of gain in the C band and the wavelength characteristic of gain in the L band, respectively. Each of the gain equalizers 52 and 56 may be provided by a fiber grating.

Figure 3:
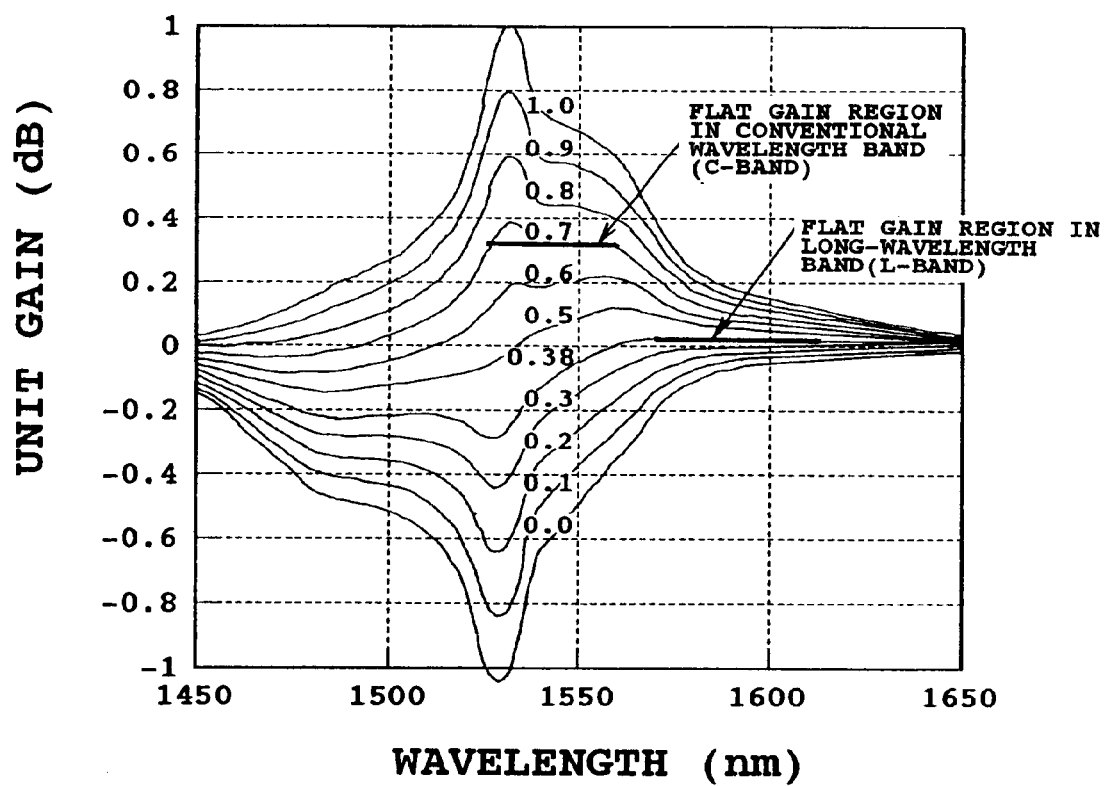
FIG. 3 is a graph showing changes in wavelength characteristic of gain of a typical EDFA (erbium doped fiber amplifier) with a population inversion factor used as a parameter.

FIG. 3 is a graph showing changes in wavelength characteristic of gain of a typical EDFA with a population inversion factor used as a parameter. In FIG. 3, the vertical axis represents unit gain (dB), and the horizontal axis represents wavelength (nm). A gain flat region in the C band appears near a population inversion factor of 0.7, and has a bandwidth of about 30 nm including a wavelength of 1.53 $\mu$m giving a gain peak. On the other hand, a gain flat region in the L band appears near a population inversion factor of 0.38, and has a bandwidth greater than 30 nm. The unit gain in the L band is about ⅛ of the unit gain in the C band. Accordingly, it is necessary to increase the length of an EDF in an EDFA for the L band. For example, in the case that the EDFs 38 and 44 shown in FIG. 2 have the same composition in relation to Er concentration and Al concentration, the EDF 44 for the L band is set longer than the EDF 38 for the C band by an amount corresponding to a difference in unit gain.

TABLE 1

| Items | C band | L band |
| --- | --- | --- |
| Amplification region | 1,525~1,565 nm (40 nm) | 1,570~1,610 nm (40 nm) |
| 1-dB gain flat region | 1,542~1,558 nm (16 nm) | 1,570~1,600 nm (30 nm) |
| Noise figure | 4.1 dB or less | 4.8 dB or less |
| EDF length | 30 m or less | 150 m or less |

Table 1 shows typical characteristics of EDFAs for the C band and the L band. In Table 1, the "amplification region" is a region where gain is generated; the "1-dB gain flat region" is a region where a gain deviation is 1 dB; the "noise figure" is a noise figure in the case of using pump light having a 1.48 $\mu$m band; and the "EDF length" is an EDF length for obtaining a gain of 30 dB.

Figure 4:
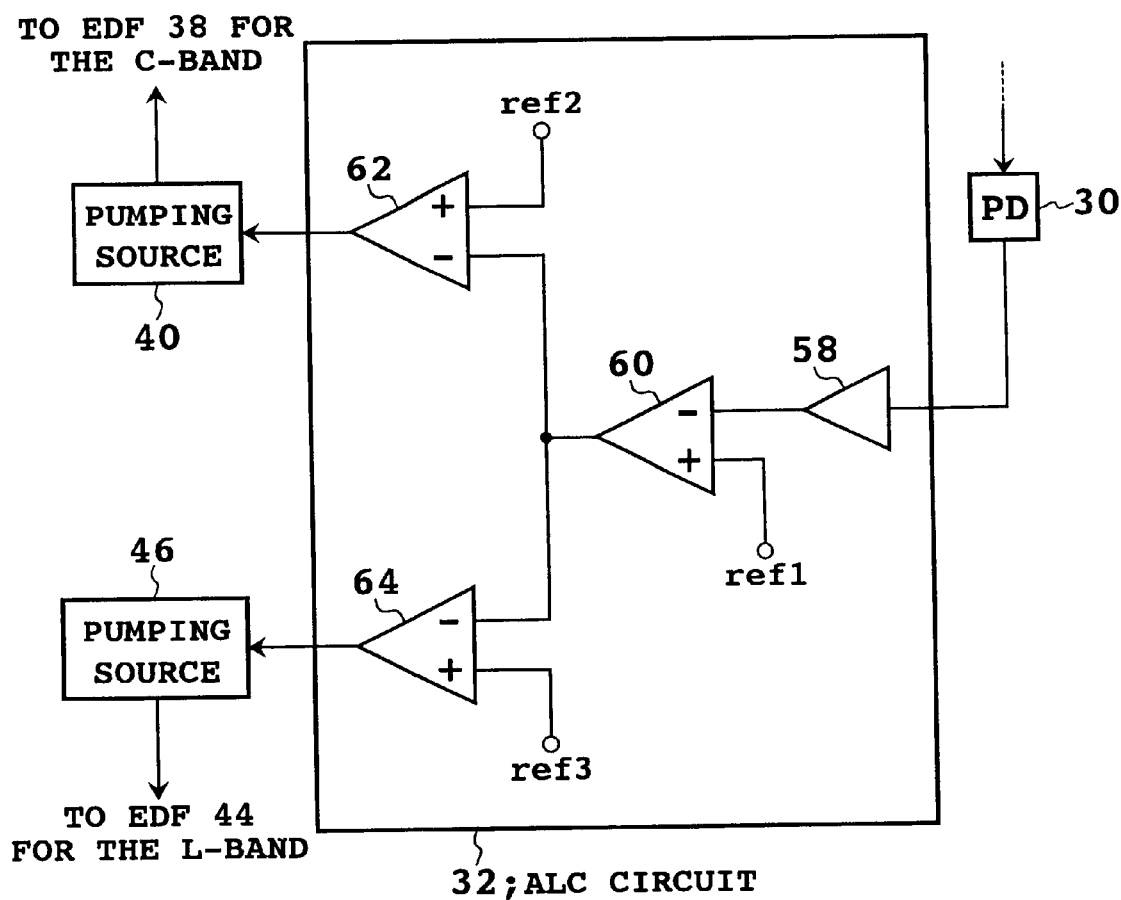
FIG. 4 is a block diagram showing a preferred embodiment of the ALC (automatic level control) circuit applicable to the optical amplifier according to the present invention.

FIG. 4 is a block diagram showing a preferred embodiment of the ALC circuit applicable to the optical amplifier according to the present invention. The total optical power at the output port 22 (see FIG. 2) is reflected by an output signal from the photodetector 30. The output signal from the photodetector 30 is amplified by an amplifier 58, and then supplied to a negative input port of a differential amplifier 60. A reference signal ref1 for setting the total output power for the C band and the L band is supplied to a positive input port of the differential amplifier 60. An output signal from the differential amplifier 60 is supplied to negative input ports of differential amplifiers 62 and 64. A reference signal ref2 for setting a reference value of the pump light power for the C band is supplied to a positive input port of the differential amplifier 62. A reference signal ref3 for setting a reference value of the pump light power for the L band is supplied to a positive input port of the differential amplifier 64. The power of pump light to be supplied from the pumping source 40 to the EDF 38 for the C band is adjusted according to an output signal from the differential amplifier 62, and the power of pump light to be supplied from the pumping source 46 to the EDF 44 for the L band is adjusted according to an output signal from the differential amplifier 64. More specifically, a drive current for a laser diode included in each of the pumping sources 40 and 46 is controlled according to an output from the ALC circuit 32.

According to the preferred embodiment shown in FIG. 4, an error signal of the output from the photodetector 30 with respect to the reference signal ref1 can be obtained by using the differential amplifier 60, and the drive currents for the pumping sources 40 and 46 can be controlled by the differential amplifiers 62 and 64, respectively, so that this error signal becomes zero or constant. The reference signals ref2 and ref3 may be determined in consideration of a difference in required pump light power between the EDF 38 for the C band and the EDF 44 for the L band.

Figure 5:
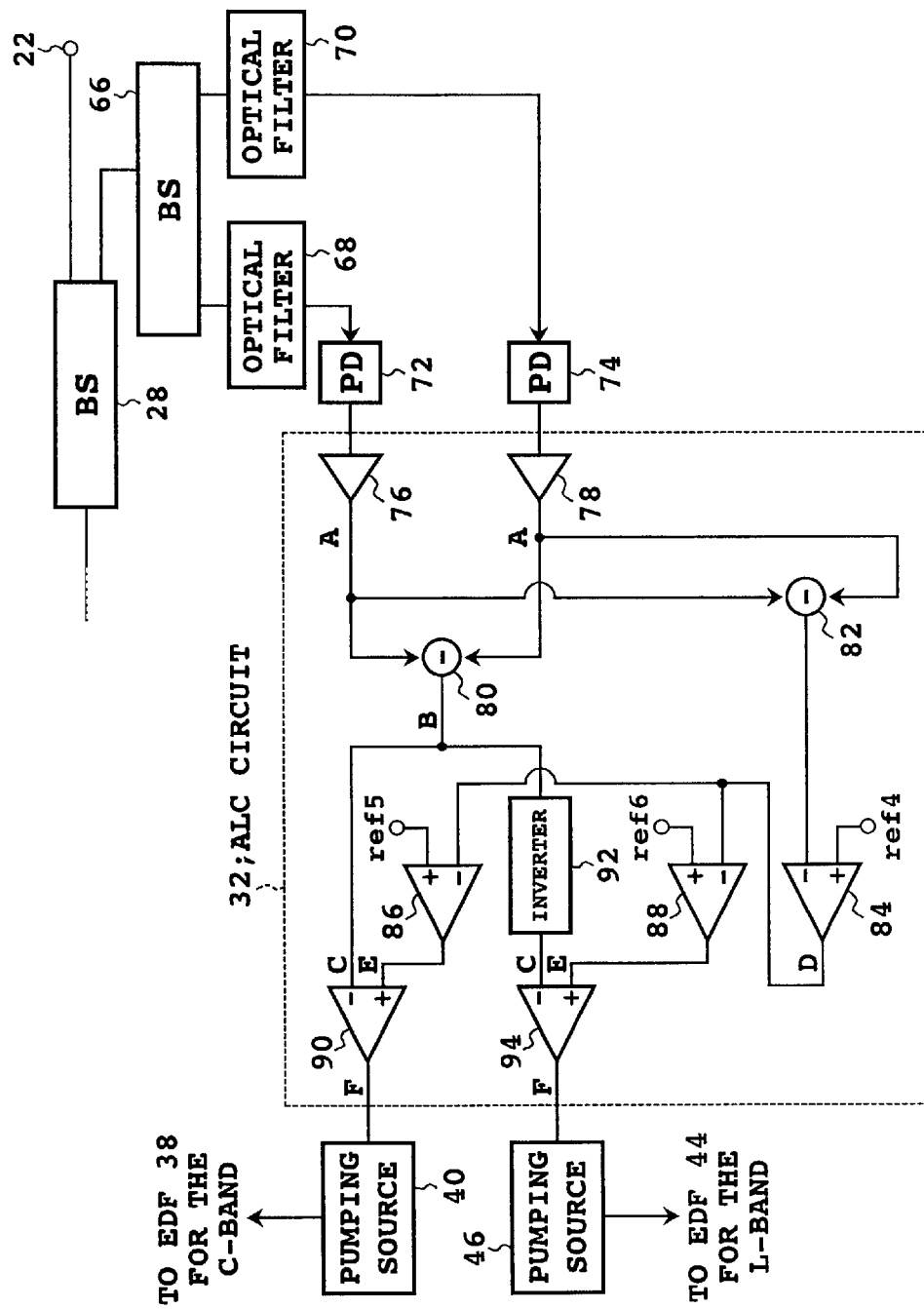
FIG. 5 is a block diagram showing another preferred embodiment of the ALC circuit applicable to the optical amplifier according to the present invention.

FIG. 5 is a block diagram showing another preferred embodiment of the ALC circuit applicable to the optical amplifier according to the present invention. In this preferred embodiment, another beam splitter 66 is provided to divide the monitor beam from the beam splitter 28 into first and second monitor beams having almost equal powers. The first and second monitor beams are supplied to optical filters 68 and 70, respectively. The optical filters 68 and 70 have passbands respectively including the C band and the L band.

Figure 6:
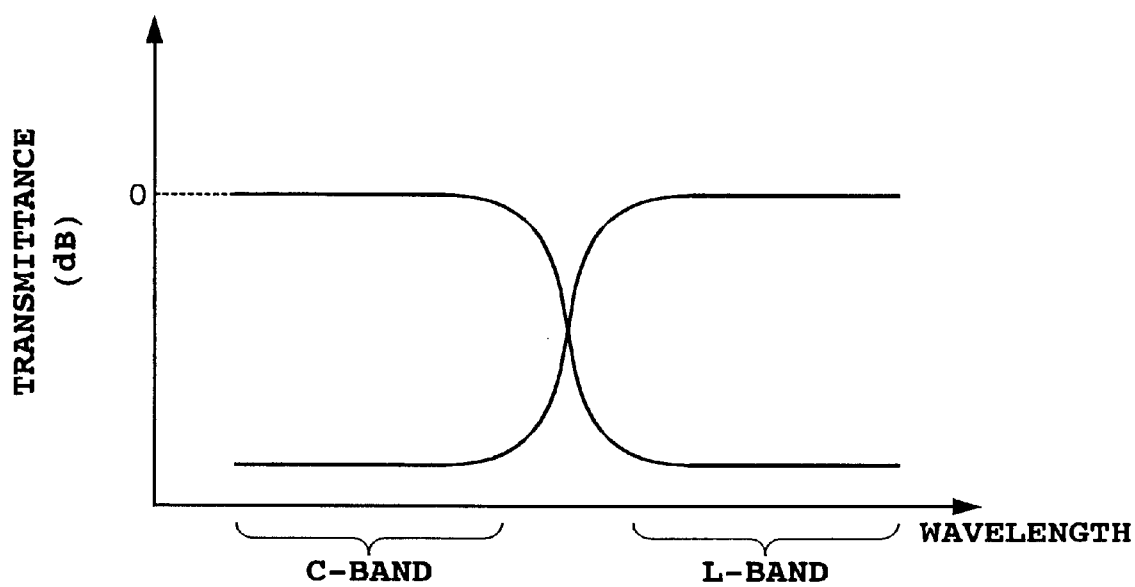
FIG. 6 is a graph showing the characteristics of optical filters shown in FIG. 5.

FIG. 6 shows an example of the characteristics of the optical filters 68 and 70. In FIG. 6, the vertical axis represents transmittance (dB) and the horizontal axis represents wavelength. In this preferred embodiment, the optical filter 68 is provided by a short-wave pass filter having a passband including the C band, and the optical filter 70 is provided by a long-wave pass filter having a passband including the L band.

Output beams from the optical filters 68 and 70 are supplied to photodetectors 72 and 74, respectively. Particularly in this preferred embodiment, the ALC circuit 32 is configured by a differential circuit for individually adjusting the drive currents for the pumping sources 40 and 46 according to outputs from the photodetectors 72 and 74. More specifically, the configuration of the ALC circuit 32 is as follows:

An output signal from the photodetector 72 is amplified by an amplifier 76 and next supplied to an input port of a subtractor 80 and to an input port of an adder 82. An output signal from the photodetector 74 is amplified by an amplifier 78 and next supplied to the other input port of the subtractor 80 and to the other input port of the adder 82. An output signal from the adder 82 is supplied to a negative input port of a differential amplifier 84. A reference signal ref4 for setting the total output power for the C band and the L band is supplied to a positive input port of the differential amplifier 84. An output signal from the differential amplifier 84 is supplied to negative input ports of differential amplifiers 86 and 88, respectively. A reference signal ref5 for setting a reference value of the pump light power for the C band is supplied to a positive input port of the differential amplifier 86, and a reference signal ref6 for setting a reference value of the pump light power for the L band is supplied to a positive input port of the differential amplifier 88.

An output signal from the subtractor 80 is supplied to a negative input port of a differential amplifier 90 and also to a negative input port of a differential amplifier 94 through an inverter circuit 92 wherein the polarity of an input signal is inverted. output signals from the differential amplifiers 86 and 88 are supplied to positive input ports of the differential amplifiers 90 and 94, respectively. The power of pump light to be supplied from the pumping source 40 to the EDF 38 for the C band is adjusted according to an output signal from the differential amplifier 90, and the power of pump light to be supplied from the pumping source 46 to the EDF 44 for the L band is adjusted according to an output signal from the differential amplifier 94.

FIG. 7A shows changes in signal level at various points shown in FIG. 5 when the signal light power in the L band is unchanged and the signal light power in the C band is decreased, and FIG. 7B shows changes in signal level at these points when the signal light powers both in the C band and in the L band are decreased. In FIGS. 7A and 7B, "A" represents outputs from the amplifiers 76 and 78, "B" represents an output from the subtractor 80, "C" represents inverted inputs (negative inputs) to the differential amplifiers 90 and 94, "D" represents an output from the differential amplifier 84, "E" represents uninverted inputs (positive inputs) to the differential amplifiers 90 and 94, and "F" represents outputs from the amplifiers 90 and 94.

In the case that the signal light power in the L band is unchanged and the signal light power in the C band is decreased as shown in FIG. 7A, the power of pump light to be supplied from the pumping source 46 to the EDF 44 for the L band is maintained, and the power of pump light to be supplied from the pumping source 40 to the EDF 38 for the C band is increased. In the case that the signal light powers both in the C band and in the L band are decreased as shown in FIG. 7B, the power of pump light to be supplied from the pumping source 40 to the EDF 38 for the C band is increased, and the power of pump light to be supplied from the pumping source 46 to the EDF 44 for the L band is increased.

According to the preferred embodiment of the ALC circuit shown in FIG. 5, the drive currents for the pumping sources 40 and 46 can be individually adjusted according to the outputs from the photodetectors 72 and 74. Accordingly, even when the signal light power in any one of the C band and the L band is changed, ALC can be performed so as to compensate for such a change.

Figure 8:
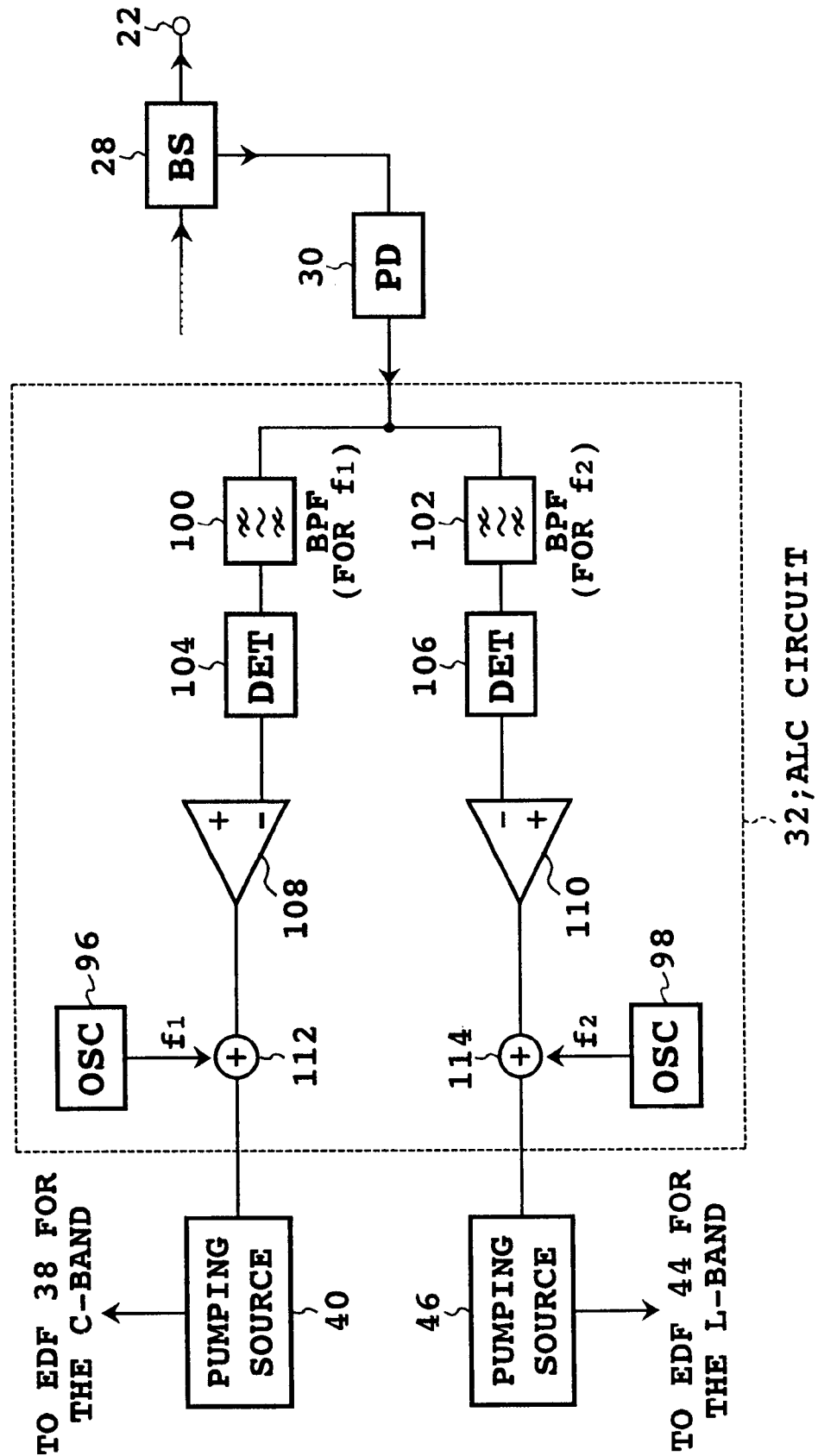
FIG. 8 is a block diagram showing a further preferred embodiment of the ALC circuit applicable to the optical amplifier according to the present invention.

FIG. 8 is a block diagram showing a further preferred embodiment of the ALC circuit applicable to the optical amplifier according to the present invention. This preferred embodiment employs an oscillator (OSC) 96 oscillating at a frequency $f_1$ to intensity-modulate or amplitude-modulate at $f_1$ the pump light to be supplied from the pumping source 40 to the EDF 38 for the C band and an oscillator 98 oscillating at a frequency $f_2$ ($\neq f_1$) to intensity-modulate or amplitude-modulate at $f_2$ the pump light to be supplied from the pumping source 46 to the EDF 44 for the L band. Each of the frequencies $f_1$ and $f_2$ is set to several kHz, for example, so as not to have any influence on the transmission of a main signal, and the amplitude of the modulating signals having the frequencies $f_1$ and $f_2$ are almost equal to each other, so as to simplify a circuit configuration.

An output signal from the photodetector 30 is supplied to a bandpass filter (BPF) 100 having a passband including the frequency $f_1$ and to a bandpass filter 102 having a passband including the frequency $f_2$. Output signals from the filters 100 and 102 are supplied to discriminators (DET) 104 and 106, respectively. The discriminators 104 and 106 detect the amplitudes of frequency components corresponding to the frequencies $f_1$ and $f_2$ included in the output signal from the photodetector 30, respectively. output signals from the discriminators 104 and 106 are supplied to negative input ports of differential amplifiers 108 and 110, respectively. A reference signal for setting a reference value of the amplitude of the frequency component corresponding to $f_1$ is supplied to a positive input port of the differential amplifier 108, and a reference signal for setting a reference value of the amplitude of the frequency component corresponding to $f_2$ is supplied to a positive input port of the differential amplifier 110. The drive current for the pumping source 40 is adjusted according to an output signal from the differential amplifier 108, and the signal from the oscillator 96 is superimposed on this drive current adjusted. Further, the drive current for the pumping source 46 is adjusted according to an output signal from the differential amplifier 110, and the signal from the oscillator 98 is superimposed on this drive current adjusted.

The signal light power in the C band at the output port 22 is reflected by the amplitude of the frequency component corresponding to $f_1$ included in the output signal from the photodetector 30, and the signal light power in the L band at the output port 22 is reflected by the amplitude of the frequency component corresponding to $f_2$ included in the output signal from the photodetector 30. According to the preferred embodiment shown in FIG. 8, the pump light for the C band and the pump light for the L band can be individually controlled as in the preferred embodiment shown in FIG. 5.

In the preferred embodiment shown in FIG. 8, the oscillators 96 and 98 are provided in the ALC circuit 32 to modulate the pump light powers for the EDFs 38 and 44 (i.e., the gains in the optical amplifiers 14 and 16). Alternatively, no oscillators may be provided in the ALC circuit 32, but the signal light powers in the C band and the L band may be preliminarily modulated at different frequencies in the first terminal 2 shown in FIG. 1, thereby maintaining the output power of each optical repeater 8 constant.

Figure 9:
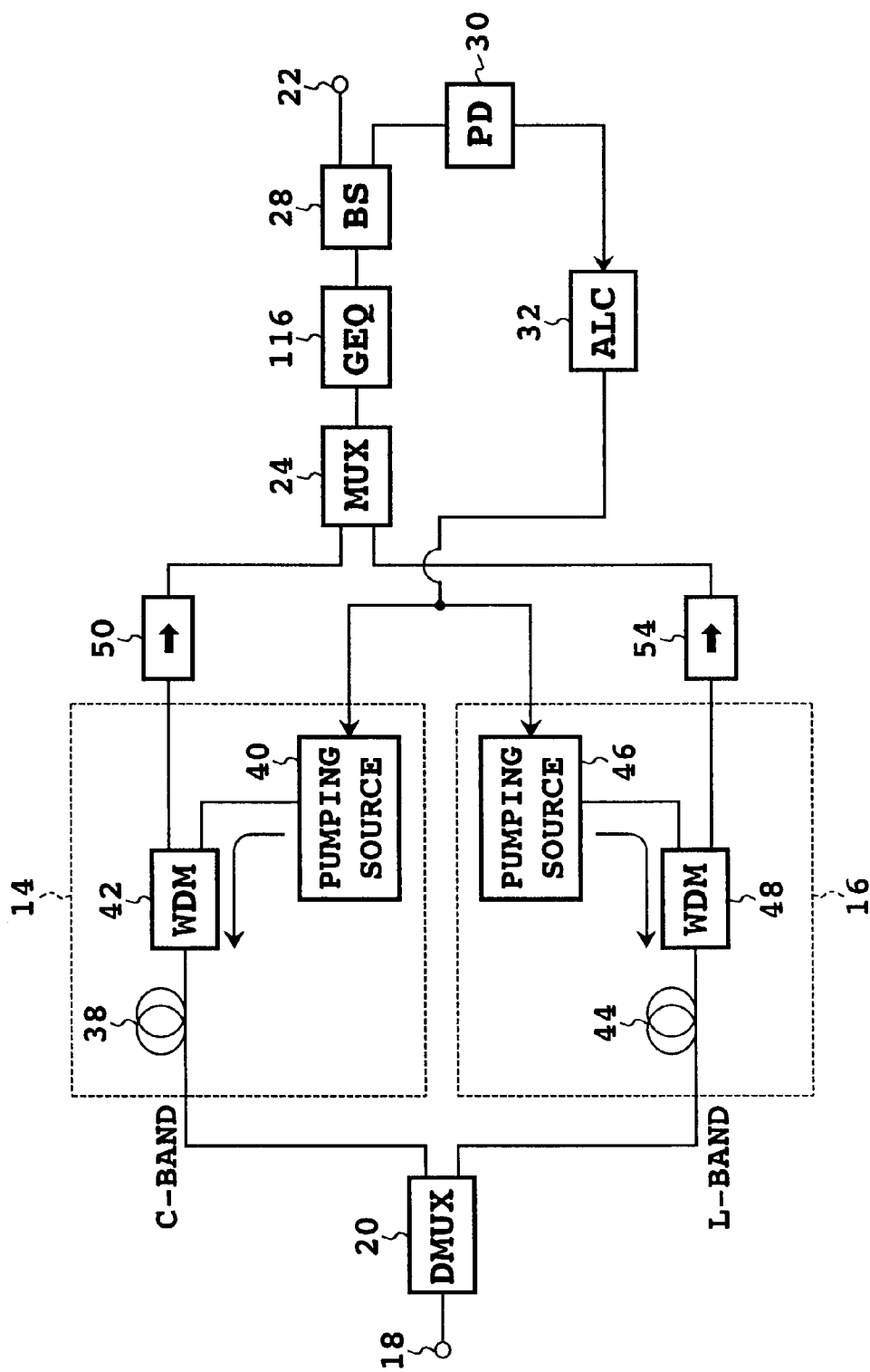
FIG. 9 is a block diagram showing another preferred embodiment of the optical amplifier according to the present invention.

FIG. 9 is a block diagram showing another preferred embodiment of the optical amplifier according to the present invention. This preferred embodiment is characterized in that a gain equalizer 116 commonly used for the C band and the L band is provided between the optical multiplexer 24 and the beam splitter 28. For example, the gain equalizer 116 may be composed of a fiber grating for the C band and a fiber grating for the L band cascaded together to provide a single optical component. Accordingly, as compared with the preferred embodiment shown in FIG. 2, the number of optical components can be reduced by one. In the case that the fiber grating for the C band and the fiber grating for the L band are cascaded to configure the gain equalizer 116, signal light in the C band is also passed through the fiber grating for the L band, and signal light in the L band is also passed through the fiber grating for the C band. However, the wavelength characteristic of loss in the L band is flat in the fiber grating for the C band. Similarly, the wavelength characteristic of loss in the C band is flat in the fiber grating for the L band. Thus, no problem arises.

According to this preferred embodiment, the wavelength characteristic of gain in each of the C band and the L band can be made substantially flat by providing the gain equalizer 116 at the output of the optical multiplexer 24. Further, since the ALC circuit 32 and the gain equalizer 116 are used commonly for the C band and the L band, an optical amplifier having a broad band can be provided with a simple configuration.

Figure 10:
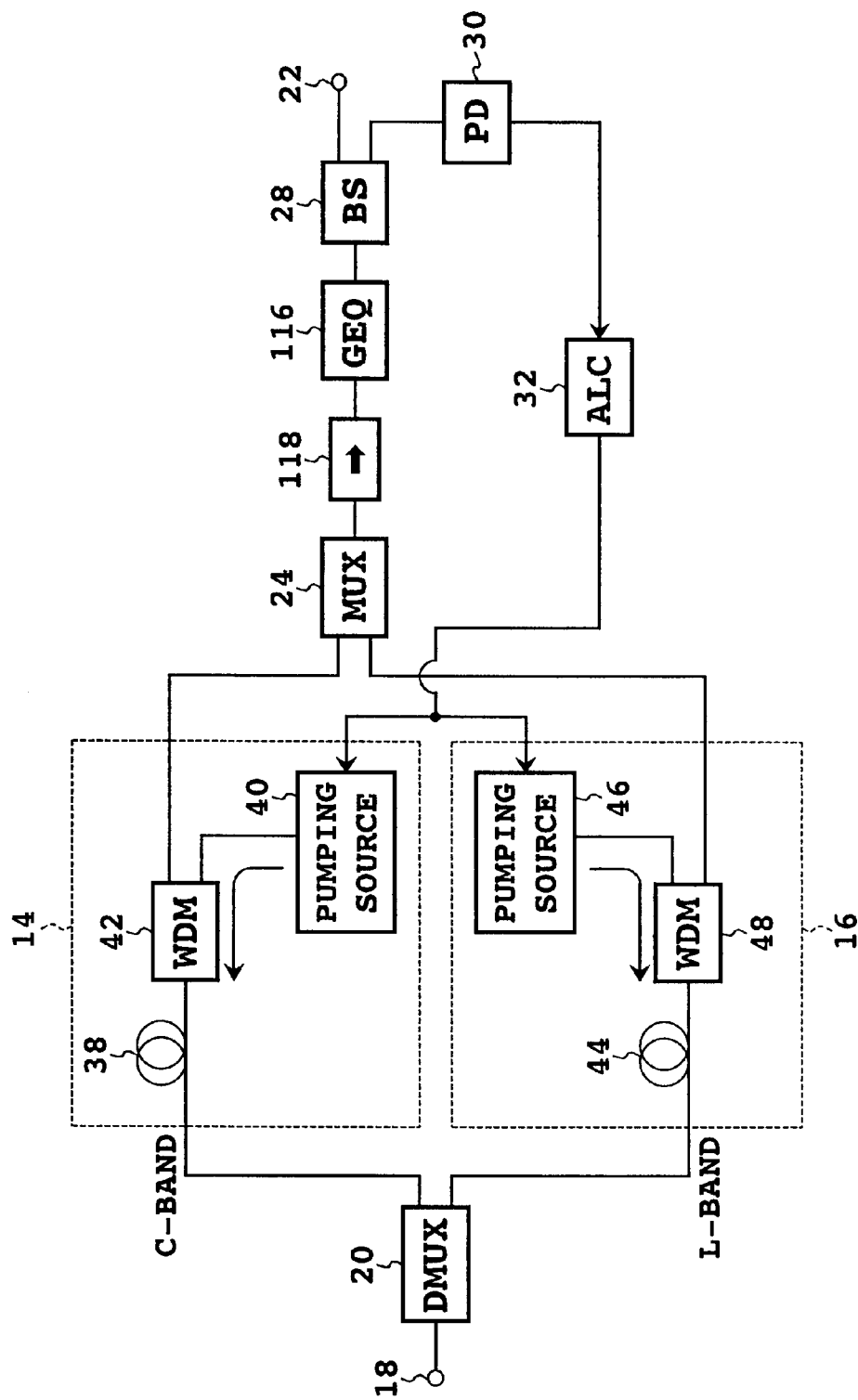
FIG. 10 is a block diagram showing a further preferred embodiment of the optical amplifier according to the present invention.

FIG. 10 is a block diagram showing a further preferred embodiment of the optical amplifier according to the present invention. In contrast to the preferred embodiment shown in FIG. 9, this preferred embodiment is characterized in that an optical isolator 118 commonly used for the C band and the L band is provided between the optical multiplexer 24 and the gain equalizer 116. Accordingly, the optical isolators 50 and 54 shown in FIG. 9 are eliminated in this preferred embodiment. According to this preferred embodiment, the ALC circuit 32, the gain equalizer 116, and the optical isolator 118 are used commonly for the C band and the L band, so that an optical amplifier having a broad band can be provided with a simpler configuration.

According to the present invention as described above, it is possible to provide an optical amplifier having a broad band and a simple configuration and to also provide a system having the optical amplifier. The effects obtained by the specific preferred embodiments of the present invention have been so far described, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical amplifier comprising:

a first optical amplifier for providing a gain for a first band;

a second optical amplifier for providing a gain for a second band different from said first band;

an optical demultiplexer for optically coupling said first optical amplifier and an input port by said first band and for optically coupling said second amplifier and said input port by said second band;

an optical multiplexer for optically coupling said first optical amplifier and an output port by said first band and for optically coupling said second optical amplifier and said output port by said second band; and a control unit for controlling said first and second optical amplifiers so that an optical power at said output port becomes constant.

2. An optical amplifier according to claim 1, wherein:

each of said first and second optical amplifiers comprises a doped fiber doped with a rare earth element, and a pumping source for supplying pump light to said doped fiber; and said control unit controls powers of said pump lights to be supplied to said doped fibers of said first and second optical amplifiers.

3. An optical amplifier according to claim 2, wherein:

said rare earth element is erbium (Er);

said first band includes a C band defined by the range of 1.53 to 1.57 $\mu$m; and said second band includes an L band defined by the range of 1.57 to 1.61 $\mu$m.

4. An optical amplifier according to claim 3, wherein said doped fiber of said second optical amplifier is longer than said doped fiber of said first optical amplifier.

5. An optical amplifier according to claim 2, wherein:

said control unit comprises an optical beam splitter for separating an output from said optical multiplexer to obtain a monitor beam, a photodetector for receiving said monitor beam, a circuit for outputting an error signal of an output from said photodetector with respect to a reference signal, and a circuit for controlling drive currents for said pumping sources of said first and second optical amplifiers so that said error signal becomes zero or constant.

6. An optical amplifier according to claim 2, wherein said control unit comprises an optical beam splitter for separating an output from said optical multiplexer to obtain first and second monitor beams, first and second optical filters respectively having a passband including said first band and a passband including said second band, said first and second monitor beams being supplied to said first and second optical filters, respectively, first and second photodetectors for respectively receiving outputs from said first and second optical filters, and a differential circuit for individually adjusting drive currents for said pumping sources of said first and second optical amplifiers according to outputs from said first and second photodetectors.

7. An optical amplifier according to claim 2, wherein said control unit comprises a circuit for modulating said pump lights to be supplied to said doped fibers of said first and second optical amplifiers with first and second frequencies, respectively, an optical beam splitter for separating an output from said optical multiplexer to obtain a monitor beam, a photodetector for receiving said monitor beam, and a circuit for controlling drive currents for said pumping sources of said first and second optical amplifiers so that the amplitudes of frequency components corresponding to said first and second frequencies included in an output from said photodetector become constant.

8. An optical amplifier according to claim 1, further comprising:
 a first optical isolator and a first gain equalizer each provided on a first optical path including said first optical amplifier; and
 a second optical isolator and a second gain equalizer each provided on a second optical path including said second optical amplifier;
 said first gain equalizer substantially flattening a wavelength characteristic of gain in said first band;
 said second gain equalizer substantially flattening a wavelength characteristic of gain in said second band.

9. An optical amplifier according to claim 1, further comprising a gain equalizer connected to an output of said optical multiplexer, said gain equalizer substantially flattening a wavelength characteristic of gain in each of said first and second bands.

10. An optical amplifier according to claim 9, further comprising an optical isolator connected between said optical multiplexer and said gain equalizer.

11. A system comprising:
 an optical fiber transmission line for transmitting WDM signal light obtained by wavelength division multiplexing at least one optical signal having a wavelength included in a first band and at least one optical signal having a wavelength included in a second band different from said first band; and
 at least one optical repeater arranged along said optical fiber transmission line;
 each of said at least one optical repeater comprising:
  first and second optical amplifiers for respectively providing gains for said first and second bands;
  an optical demultiplexer for optically coupling said first optical amplifier and an input port by said first band and for optically coupling said second optical amplifier and said input port by said second band;
  an optical multiplexer for optically coupling said first optical amplifier and an output port by said first band and for optically coupling said second optical amplifier and said output port by said second band; and
  a control unit for controlling said first and second optical amplifiers so that an optical power at said output port becomes constant.

12. An apparatus which amplifies a wavelength division multiplexed (WDM) light including a plurality of optical signals multiplexed together, the plurality of optical signals including optical signals in a first wavelength band and optical signals in a second wavelength band different from the first wavelength band, the apparatus comprising:
 a demultiplexer demultiplexing the WDM light into a first light including said optical signals in the first wavelength band and a second light including said optical signals in the second wavelength band;
 a first optical amplifier amplifying the first light and having a gain band which includes the first wavelength band;
 a second optical amplifier amplifying the second light and having a gain band which includes the second wavelength band;
 a multiplexer multiplexing together the amplified first light and the amplified second light, to produced a multiplexed output light; and
 a controller controlling the first and second optical amplifiers in common so that an optical power of the multiplexed output light is maintained at a constant level.

13. An apparatus as in claim 12, wherein
 the first optical amplifier comprises a fiber doped with a rare earth element, and a pump source supplying pump light to the doped fiber to that the first light is amplified as the first light travels through the doped fiber,
 the second optical amplifier comprises a fiber doped with a rare earth element, and a pump source supplying pump light to the doped fiber to that the second light is amplified as the second light travels through the doped fiber, and
 the controller controls power of the pump light supplied by the pump source of the first optical amplifier and controls power of the pump light supplied by the pump source of the second optical amplifier, to thereby control the first and second optical amplifiers.

14. An apparatus as in claim 13, wherein
 the rare earth element doping the fibers of the first and second optical amplifiers is erbium,
 the first wavelength band is C band defined by the range of 1.53 $\mu$m to 1.57 $\mu$m, and
 the second wavelength band is L band defined by the range of 1.57 $\mu$m to 1.61 $\mu$m.

15. An apparatus as in claim 14, wherein the doped fiber of the second optical amplifier is longer than the doped fiber of the first optical amplifier.

16. An apparatus as in claim 12, wherein the controller comprises:
 an optical splitter splitting off a portion of the multiplexed output light, and
 a control unit controlling the first and second optical amplifiers in accordance with said portion.

17. An apparatus as in claim 13, wherein the controller comprises:
 an optical splitter splitting off a portion of the multiplexed output light,
 a photodetector receiving said portion and producing a corresponding error signal indicating a deviation in power of said portion with a reference signal; and
 a circuit controlling a drive current of the pump source of the first optical amplifier and a drive current of the pump source of the second optical amplifier so that the error signal becomes zero or constant, to thereby control the first and second optical amplifiers.

18. An apparatus as in claim 12, further comprising:
 a first optical isolator and a first gain equalizer provided along an optical path traveled by the first light between the demultiplexer and the multiplexer, the first gain equalizer substantially flattening a wavelength characteristic of gain in the first wavelength band, and
 a second optical isolator and a second gain equalizer provided along an optical path traveled by the second light between the demultiplexer and the multiplexer, the second gain equalizer substantially flattening a wavelength characteristic of gain in the second wavelength band.

19. An apparatus as in claim 12, further comprising:
 a gain equalizer positioned after an output of the multiplexer and substantially flattening a wavelength characteristic of gain in each of the first and second wavelength bands of the multiplexed output light.

20. An apparatus as in claim 19, further comprising:
an optical isolator between the multiplexer and the gain equalizer.

21. An apparatus as in claim 12, wherein the apparatus is an optical amplifier positioned along an optical fiber transmission line to amplify the WDM light.

22. An apparatus as in claim 13, wherein the apparatus is an optical amplifier positioned along an optical fiber transmission line to amplify the WDM light.

23. An optical communication system comprising:
an optical transmission line through which a wavelength division multiplexed (WDM) light travels, the WDM light including a plurality of optical signals multiplexed together, the plurality of optical signals including optical signals in a first wavelength band and optical signals in a second wavelength band different from the first wavelength band; and
an optical amplifier positioned along the transmission line to amplify the WDM light, the optical amplifier comprising
an input port receiving the WDM light from the transmission line,
a demultiplexer demultiplexing the received WDM light into a first light including said optical signals in the first wavelength band and a second light including said optical signals in the second wavelength band,
a first optical amplifier amplifying the first light and having a gain band which includes the first wavelength band,
a second optical amplifier amplifying the second light and having a gain band which includes the second wavelength band,
a multiplexer multiplexing together the amplified first light and the amplified second light, to thereby produce a multiplexed output light,
an output port through which the multiplexed output light is output to the transmission line, and
a controller controlling the first and second optical amplifiers in common so that an optical power of the multiplexed output light is maintained at a constant level.

24. An optical communication system as in claim 23, wherein
the first optical amplifier comprises a fiber doped with a rare earth element, and a pump source supplying pump light to the doped fiber to that the first light is amplified as the first light travels through the doped fiber,
the second optical amplifier comprises a fiber doped with a rare earth element, and a pump source supplying pump light to the doped fiber to that the second light is amplified as the second light travels through the doped fiber, and
the controller controls power of the pump light supplied by the pump source of the first optical amplifier and controls power of the pump light supplied by the pump source of the second optical amplifier, to thereby control the first and second optical amplifiers.

25. An optical communication system as in claim 24, wherein
the rare earth element doping the fibers of the first and second optical amplifiers is erbium,
the first wavelength band is C band defined by the range of 1.53 $\mu$m to 1.57 $\mu$m, and
the second wavelength band is L band defined by the range of 1.57 $\mu$m to 1.61 $\mu$m.

26. An optical communication system as in claim 25, wherein the doped fiber of the second optical amplifier is longer than the doped fiber of the first optical amplifier.

27. An optical communication system as in claim 23, wherein the controller comprises:
an optical splitter splitting off a portion of the multiplexed output light,
a control unit controlling the first and second optical amplifiers in accordance with said portion.

28. An optical communication system as in claim 24, wherein the controller comprises:
an optical splitter splitting off a portion of the multiplexed output light,
a photodetector receiving said portion and producing a corresponding error signal indicating a deviation in power of said portion with a reference signal; and
a circuit controlling a drive current of the pump source of the first optical amplifier and a drive current of the pump source of the second optical amplifier so that the error signal becomes zero or constant, to thereby control the first and second optical amplifiers.

29. An optical communication system as in claim 23, further comprising:
a first optical isolator and a first gain equalizer provided along an optical path traveled by the first light between the demultiplexer and the multiplexer, the first gain equalizer substantially flattening a wavelength characteristic of gain in the first wavelength band, and
a second optical isolator and a second gain equalizer provided along an optical path traveled by the second light between the demultiplexer and the multiplexer, the second gain equalizer substantially flattening a wavelength characteristic of gain in the second wavelength band.

30. An optical communication system as in claim 23, further comprising:
a gain equalizer positioned after an output of the multiplexer and substantially flattening a wavelength characteristic of gain in each of the first and second wavelength bands of the multiplexed output light.

31. An optical communication system as in claim 30, further comprising:
an optical isolator between the multiplexer and the gain equalizer.

32. An apparatus which amplifies a wavelength division multiplexed (WDM) light including a plurality of optical signals multiplexed together, the plurality of optical signals including optical signals in a first wavelength band and optical signals in a second wavelength band different from the first wavelength band, the apparatus comprising:
a demultiplexer demultiplexing the WDM light into a first light including said optical signals in the first wavelength band and a second light including said optical signals in the second wavelength band;
a first optical amplifier amplifying the first light and having a gain band which includes the first wavelength band;
a second optical amplifier amplifying the second light and having a gain band which includes the second wavelength band;
a multiplexer multiplexing together the amplified first light and the amplified second light, to produced a multiplexed output light; and means for controlling the first and second optical amplifiers in common so that an optical power of the multiplexed output light is maintained at a constant level.

33. An apparatus which amplifies a wavelength division multiplexed (WDM) light including a plurality of optical signals multiplexed together, the plurality of optical signals including optical signals in a first wavelength band and optical signals in a second wavelength band different from the first wavelength band, the apparatus comprising:

means for demultiplexing the WDM light into a first light including said optical signals in the first wavelength band and a second light including said optical signals in the second wavelength band;

a first optical amplifier amplifying the first light and having a gain band which includes the first wavelength band;

a second optical amplifier amplifying the second light and having a gain band which includes the second wavelength band;

means for multiplexing together the amplified first light and the amplified second light, to produced a multiplexed output light; and means for controlling the first and second optical amplifiers in common so that an optical power of the multiplexed output light is maintained at a constant level.

34. An apparatus which amplifies a wavelength division multiplexed (WDM) light including a plurality of optical signals multiplexed together, the plurality of optical signals including optical signals in a first wavelength band and optical signals in a second wavelength band different from the first wavelength band, the apparatus comprising:

an optical demultiplexer demultiplexing the WDM light into a first light including said optical signals in the first wavelength band and a second light including said optical signals in the second wavelength band;

a first optical amplifier amplifying the first light and having a gain band which includes the first wavelength band;

a second optical amplifier amplifying the second light and having a gain band which includes the second wavelength band;

an optical multiplexer multiplexing together the amplified first light and the amplified second light, to produced a multiplexed output light; and a controller controlling the first and second optical amplifiers in common so that an optical power of the multiplexed output light is maintained at a constant level.

35. An apparatus as in claim 34, wherein the apparatus is at least one of the group consisting of an optical amplifier or a repeater.

* * * * *